(12) United States Patent
Lin et al.

(10) Patent No.: US 8,489,871 B2
(45) Date of Patent: Jul. 16, 2013

(54) PREBOOT EXECUTION ENVIRONMENT TEST DEVICE AND METHOD

(75) Inventors: Le Lin, Shenzhen (CN); Ming-Shiu Ou Yang, Tu-Cheng (TW); Jun-Min Chen, Shenzhen (CN); Ming-Xiang Hu, Shenzhen (CN); Xiao-Fei Chen, Shenzhen (CN); Zhi-Jian Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 333 days.

(21) Appl. No.: 13/048,896

(22) Filed: Mar. 16, 2011

(65) Prior Publication Data
US 2012/0102309 A1 Apr. 26, 2012

(30) Foreign Application Priority Data
Oct. 26, 2010 (CN) .......................... 2010 1 0520055

(51) Int. Cl.
*G06F 9/00* (2006.01)
*G01R 27/28* (2006.01)
*G06F 15/177* (2006.01)
*G06F 9/44* (2006.01)
*G06F 9/445* (2006.01)

(52) U.S. Cl.
USPC ............... 713/2; 702/119; 709/222; 717/171; 717/176

(58) Field of Classification Search
USPC ........... 713/1, 2; 702/119; 709/222; 717/171, 717/176
See application file for complete search history.

(56) References Cited

U.S. PATENT DOCUMENTS

| 7,243,224 | B2 * | 7/2007 | Nair et al. ......................... 713/2 |
| 7,340,538 | B2 * | 3/2008 | Alappat et al. .................... 710/5 |
| 8,126,959 | B2 * | 2/2012 | Paul et al. ...................... 709/203 |
| 2011/0087452 | A1 * | 4/2011 | Huang et al. .................. 702/117 |

* cited by examiner

*Primary Examiner* — Stefan Stoynov
(74) *Attorney, Agent, or Firm* — Altis Law Group, Inc.

(57) ABSTRACT

A preboot execution environment (PXE) test device includes a microprocessor, one or more indicators, a network interface, a power connector, and a storage device. The network interface connects the PXE test device with a computer. The power connector connects an external power source to supply a voltage to the PXE test device. The storage device stores a boot loader, an embedded operating system, and one or more programs. The microprocessor executes the boot loader and the embedded operating system to start the PXE test device. The one or more indicators indicate a power supply status and a starting status of the PXE test device. The microprocessor further executes the one or more programs to remotely boot the computer for test PXE of a network card in the computer.

12 Claims, 4 Drawing Sheets

PREBOOT EXECUTION ENVIRONMENT TEST DEVICE AND METHOD

BACKGROUND

1. Technical Field

Embodiments of the present disclosure generally relate to test technology, and more particularly to a preboot execution environment test device and method.

2. Description of Related Art

Many computers with built-in network cards provide support for remote network booting using preboot execution environment (PXE). The PXE (also known as Pre-Execution Environment) is an environment that allows for booting of the computers using a network interface independent of data storage devices (like hard disks) or installed operating systems.

In use, it is necessary to set up a PXE-server which allows the computers to request an IP address via Dynamic Host Configuration Protocol (DHCP), and download a kernel via Trivial File Transfer Protocol (TFTP). In addition, in order to avoid conflicts with original networks, an extra network must be set up between the computers and the PXE-server for communications, a troublesome and costly requirement.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may be comprised of connected logic units, such as gates and flip-flops, and may be comprised of programmable units, such as programmable gate arrays or processors. The modules described herein may be implemented as either software and/or hardware modules and may be stored in any type of computer-readable medium or other computer storage device.

Figure 1:
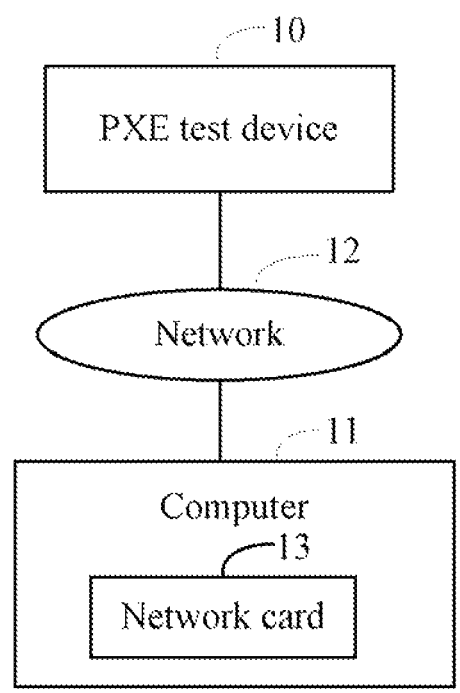
FIG. 1 is a block diagram illustrating an application environment of a PXE test device, according to embodiments of the present disclosure.

FIG. 1 is a block diagram illustrating an application environment of a PXE test device 10, according to embodiments of the present disclosure. The PXE test device 10 is connected to a computer 11 via a network 12. The computer 11 includes a network card 13, which realizes the PXE for the computer 11 to download a remote boot mirror image from a remote device, such as the PXE test device 10, to boot the computer 11.

Figure 2:
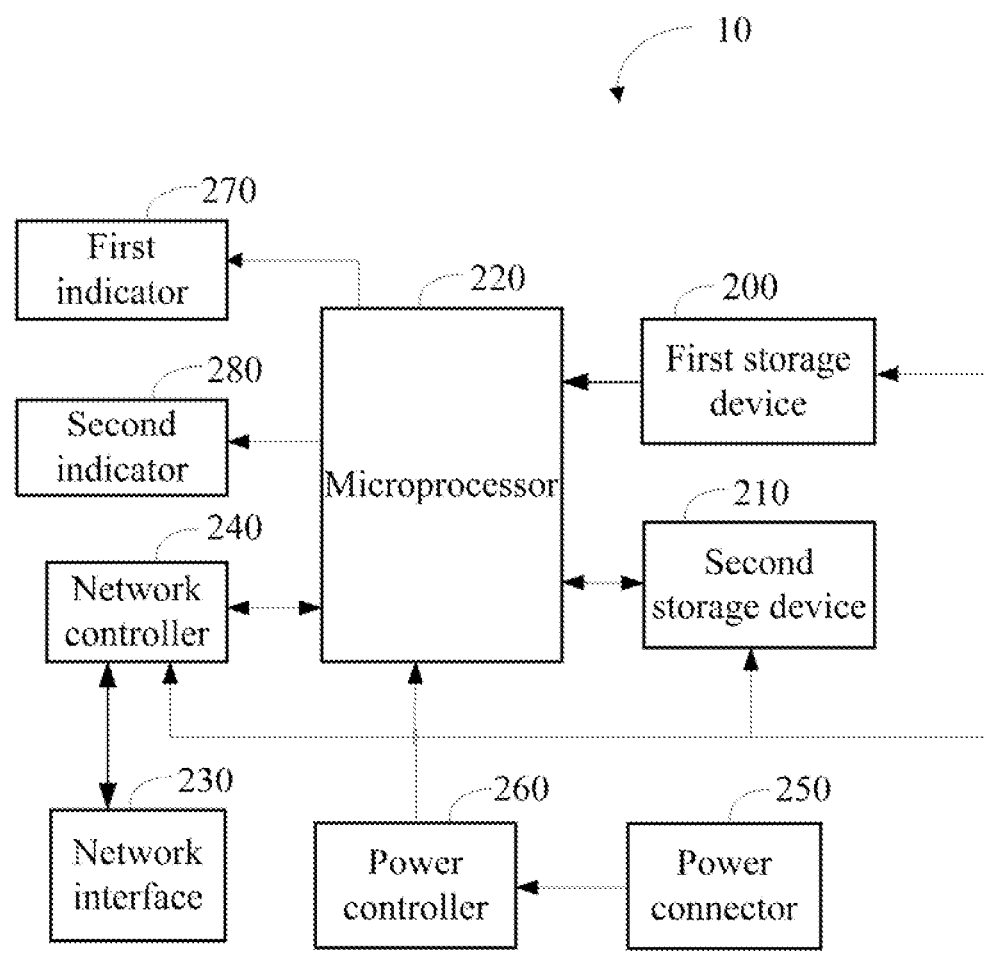
FIG. 2 is a block diagram illustrating function modules of a PXE test device, according to embodiments of the present disclosure.

FIG. 2 is a block diagram illustrating function modules of the PXE test device 10, according to embodiments of the present disclosure. The PXE test device 10 includes a first storage device 200, a second storage device 210, a microprocessor 220, a network interface 230, a network controller 240, a power connector 250, a power controller 260, a first indicator 270, and a second indicator 280.

In one embodiment, the microprocessor 220 is connected to the first storage device 200 and the second storage device 210. The network interface 230 is connected to the computer 11. The network controller 240 is connected to the microprocessor 220 and the network interface 230, and is used for transmitting data between the network interface 230 and the network card 13. The power connector 250 is connected to an external power source, such as a battery. The power controller 260, which is connected to the power connector 250, the first storage device 200, the second storage device 210, the microprocessor 220, and the network controller 240, is used for converting electrical energy provided by the external power source to a voltage supplied to the first storage device 200, the second storage device 210, the microprocessor 220, and the network controller 240.

The first storage device 200 stores one or more computerized codes in the form of one or more programs (detailed description is given in FIG. 3), the microprocessor 220 executes the one or more computerized codes, to start the PXE test device 10 and test the PXE of the computer 11. In one embodiment, the first storage device 200 is a read only memory (ROM), such as a flash memory. The second storage device 200 may be a dynamic random access memory (DRAM) which provides space for the execution of the one ore more computerized codes.

The first indicator 270, which is connected to the microprocessor 220, indicates a power supply status of the PXE test device 10. In one embodiment, the first indicator 270 may be a light-emitting diode (LED). If the voltage supplied to the PXE test device 10 is a constant voltage needed by the PXE test device 10, the first indicator 270 indicates a first preset indication status, such as continuous bright green color. Otherwise, if the voltage supplied to the PXE test device 10 is not the needed constant voltage, the first indicator 270 indicates a second preset indication status, such as continuous bright red color. In other embodiments, the first indicator 270 may be a buzzer, if the voltage supplied to the PXE test device 10 is not the needed constant voltage, the first indicator 270 sends out a buzzer alarm.

The second indicator 280, which is connected to the microprocessor 220, indicates a starting status of the PXE test device 10. In one embodiment, the second indicator 280 may also be a LED. If the PXE test device 10 is successfully started, the second indicator 280 indicates the first preset indication status, such as continuous bright green color. Otherwise, if the PXE test device 10 fails to be started, the second indicator 280 indicates the second preset indication status, such as continuous bright red light color. In other embodiments, the second indicator 280 may also be a buzzer, if the PXE test device 10 fails to be started, the second indicator 280 sends out a buzzer alarm.

Figure 3:
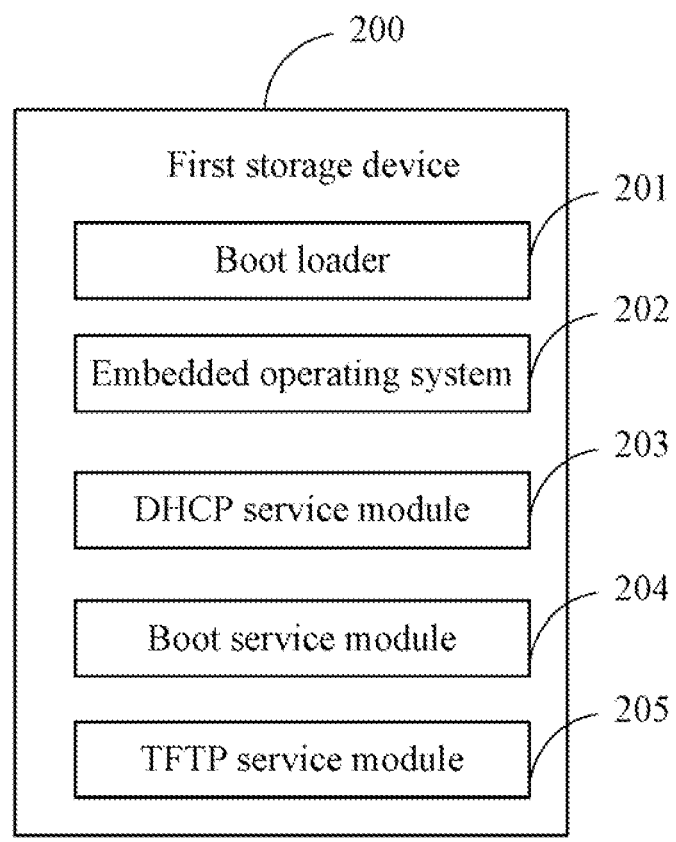
FIG. 3 is a block diagram illustrating function modules stored in a storage device of a PXE test device, according to embodiments of the present disclosure.

FIG. 3 is a block diagram illustrating function modules stored in the first storage device 200, according to embodiments of the present disclosure. The first storage device 200 includes a boot loader 201, an embedded operating system 202, a dynamic host configuration protocol (DHCP) service module 203, a boot service module 204, and a Trivial File Transfer Protocol (TFTP) service module 205. The boot loader 201 initializes hardware components of the PXE test device 10, such as the components 200-280 shown in FIG. 2.

The embedded operating system 202 may be LINUX OS. The modules 203-205 may include one or more computerized codes in the form of one or more programs. The one or more computerized codes of the modules 203-205 include instructions executed by the microprocessor 220, to provide functions for the modules of the module 203-205.

The DHCP service module 203 is operable to receive a DHCP Discover packet sent from the network card 13, and send a DHCP offer packet which includes an internet protocol (IP) address to the network card 13. It may be understood that, when the computer 11 is in the initialization state, the computer 11 has no IP address. To obtain an IP address, the computer 11 generates the DHCP Discover packet, which includes a hardware address of the computer 11 and a random transaction identifier. After receiving the DHCP Discover packet, the DHCP service module 203 generates a DHCP offer packet, which includes the IP address allocated to the computer 11, a lease of the IP address, and the same transaction identifier used in the DHCP Discover packet.

The boot service module 204 is operable to receive a DHCP REQUEST packet sent from the network card 13, and send a DHCPACK packet to the network card 13. The DHCP REQUEST packet requires the PXE test device 10 to provide resources, such as a remote boot mirror image and configuration parameters of TFTP, which enable booting of the computer 11. The DHCPACK packet includes a filename of the remote boot mirror image and the configuration parameters of TFTP.

The TFTP service module 205 is operable to receive a download request packet sent from the network card 13, establish a connection between the computer 11 and the PXE test device 10, and send the remote boot mirror image according to the configuration parameters of TFTP to the network card 13, to boot the computer 11. The download request packet includes a request to download the remote boot mirror image. If the computer 11 is successfully booted, the network card 13 passes the PXE test.

Figure 4:
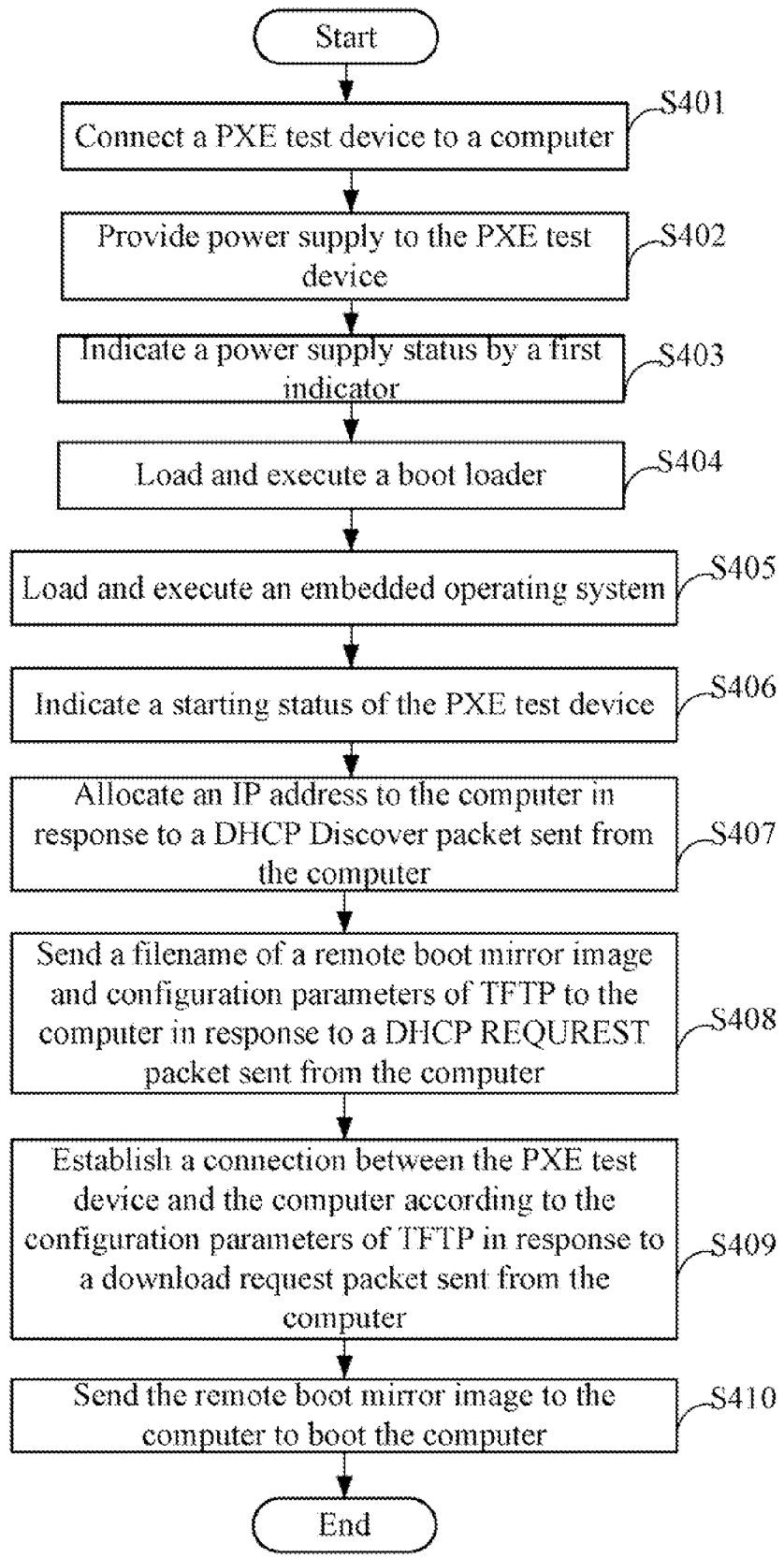
FIG. 4 is a flowchart illustrating a PXE test method, according to embodiments of the present disclosure.

FIG. 4 is a flowchart illustrating a PXE test method performed by the PXE test device 10, according to embodiments of the present disclosure. Depending on the embodiment, additional blocks may be added, others removed, and the ordering of the blocks may be changed.

In block S401, the PXE test device 10 is connected to the computer 11 via the network interface 230.

In block S402, an external power source, such as a battery, is connected to the power connector 250, the power controller 260 converts electrical energy provided by the external power source to a voltage supplied to the PXE test device 10.

In block S403, the first indicator 270 indicates a power supply status of the PXE test device 10. For example, the first indicator 270 may be a LED. If the voltage supplied to the PXE test device 10 is a constant voltage needed by the PXE test device 10, the first indicator 270 may indicate continuous bright green color. Otherwise, if the voltage supplied to the PXE test device 10 is not the needed constant voltage, the first indicator 270 may indicate continuous bright red color to prompt that the external power source needs to be changed.

In block S404, the microprocessor 220 loads the boot loader 201 from the first storage device 200, and executes the boot loader 201 in the second storage device 210, to initialize hardware components of the PXE test device 10, such as the components 200-280 described above.

In block S405, the microprocessor 220 loads the embedded operating system from the first storage device 200, and executes the boot loader 201 in the second storage device 210, to start the PXE test device 10.

In block S406, the second indicator 280 indicates a starting status of the PXE test device 10. For example, the second indicator 280 may also be a LED. If the PXE test device 10 is successfully started, the second indicator 280 indicates continuous bright green. Otherwise, if the PXE test device 10 fails to be started, the second indicator 280 indicates continuous bright red to prompt that the PXE test device 10 needs to be restarted.

In block S407, the DHCP service module 203 sends a DHCP offer packet which includes an internet protocol (IP) address to the network card 13, in response to a DHCP Discover packet received from the network card 13. It may be understood that, when the computer 11 is in the initialization state, the computer 11 has no IP address. To obtain an IP address, the computer 11 generates the DHCP Discover packet, which includes a hardware address of the computer 11 and a random transaction identifier, and the network card 13 sends the DHCP Discover packet to the PXE test device 10. After receiving the DHCP Discover packet, the DHCP service module 203 generates a DHCP offer packet, which includes the IP address allocated to the computer 11, a lease of the IP address, and the same transaction identifier used in the DHCP Discover packet.

In block S408, the boot service module 204 sends a DHCPACK packet to the network card 13, in response to a DHCP REQUEST packet received from the network card 13. The DHCP REQUEST packet requires the PXE test device 10 to provide resources, such as a remote boot mirror image and configuration parameters of TFTP, which enable booting of the computer 11. The DHCPACK packet includes a filename of the remote boot mirror image and the configuration parameters of TFTP.

In block S409, the TFTP service module 205 establishes a connection between the computer 11 and the PXE test device 10, in response to a download request packet sent from the network card 13. The download request packet includes a request to download the remote boot mirror image.

In block S410, the PXE test device sends the remote boot mirror image according to the configuration parameters of TFTP to the network card 13, to boot the computer 11. If the computer 11 is successfully booted, the network card 13 passes the PXE test.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A preboot execution environment (PXE) test device, comprising a microprocessor, one or more indicators, a network interface, a power connector, and a storage device, wherein:

the network interface connects the PXE test device with a computer;

the power connector connects an external power source to supply a voltage to the PXE test device;

the storage device stores a boot loader and an embedded operating system, the microprocessor executes the boot loader and the embedded operating system to start the PXE test device;

the one or more indicators indicate a power supply status and a starting status of the PXE test device; and the microprocessor further executes one or more programs stored in the storage device, the one or more programs comprising:

a dynamic host configuration protocol (DHCP) service module operable to send an offer packet which comprises an internet protocol (IP) address to a network card of the computer, in response to a DHCP Discover packet sent from the network card;

a boot service module operable to send a DHCPACK packet, which comprises a filename of a remote boot mirror image and configuration parameters of trivial file transfer protocol (TFTP), to the network card in response to a DHCP REQUEST packet sent from the network card; and a TFTP service module operable to establish a connection between the PXE test device and the computer and send the remote boot mirror image to the computer according to the configuration parameters of TFTP, to remotely boot the computer for testing PXE of the network card, in response to a download request packet sent from the network card.

2. The device as claimed in claim 1, wherein the one or more indicators are light-emitting diodes.

3. The device as claimed in claim 1, wherein a first indicator indicates whether a voltage supplied to the PXE test device is a constant voltage needed by the PXE test device.

4. The device as claimed in claim 1, wherein a second indicator indicates whether the PXE test device is successfully started.

5. The device as claimed in claim 1, wherein the DHCP Discover packet comprises a hardware address of the computer and a random transaction identifier.

6. The device as described in claim 5, wherein the DHCP offer packet further comprises a lease of the IP address and the same transaction identifier used in the DHCP Discover packet.

7. A preboot execution environment (PXE) test method, comprising:

connecting a PXE test device with a computer via a network interface of the PXE test device;

connecting an external power source with the PXE test device to supply a voltage to the PXE test device;

indicating a power supply status of the PXE test device by a first indicator;

executing a boot loader and an embedded operating system to start the PXE test device;

indicating a starting status of the PXE test device by a second indicator;

sending an offer packet which comprises an internet protocol (IP) address to a network card of the computer, in response to a DHCP Discover packet sent from the network card;

sending a DHCPACK packet, which comprises a filename of a remote boot mirror image and configuration parameters of trivial file transfer protocol (TFTP), to the network card in response to a DHCP REQUEST packet sent from the network card;

establishing a connection between the PXE test device and the computer in response to a download request packet sent from the network card; and sending the remote boot mirror image to the computer according to the configuration parameters of TFTP, to remotely boot the computer for testing PXE of the network card.

8. The method as claimed in claim 7, wherein the first indicator and second indicator are light-emitting diodes.

9. The method as claimed in claim 7, wherein the first indicator indicates whether a voltage supplied to the PXE test device is a constant voltage needed by the PXE test device.

10. The method as claimed in claim 7, wherein the second indicator indicates whether the PXE test device is successfully started.

11. The method as claimed in claim 7, wherein the DHCP Discover packet comprises a hardware address of the computer and a random transaction identifier.

12. The method as claimed in claim 11, wherein the DHCP offer packet further comprises a lease of the IP address and the same transaction identifier used in the DHCP Discover packet.

* * * * *